United States Patent
Dong et al.

(10) Patent No.: US 11,299,427 B2
(45) Date of Patent: Apr. 12, 2022

(54) MAGNESIUM OXIDE BASED DIELECTRIC CERAMICS WITH ULTRAHIGH DIELECTRIC BREAKDOWN STRENGTH AND ITS PREPARATION METHOD

(71) Applicant: SHANGHAI INSTITUTE OF CERAMICS, CHINESE ACADEMY OF SCIENCES, Shanghai (CN)

(72) Inventors: Xianlin Dong, Shanghai (CN); Chi Zhang, Shanghai (CN); Ying Chen, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 0 days.

(21) Appl. No.: 16/822,950

(22) Filed: Mar. 18, 2020

(65) Prior Publication Data
US 2020/0308054 A1   Oct. 1, 2020

(30) Foreign Application Priority Data
Mar. 26, 2019   (CN) .......................... 201910232703.X

(51) Int. Cl.
| | |
|---|---|
| *C04B 35/053* | (2006.01) |
| *C04B 35/443* | (2006.01) |
| *C04B 35/64* | (2006.01) |
| *C04B 35/634* | (2006.01) |
| *C04B 35/638* | (2006.01) |
| *H01B 3/12* | (2006.01) |

(52) U.S. Cl.
CPC .......... *C04B 35/053* (2013.01); *C04B 35/638* (2013.01); *C04B 35/63416* (2013.01); *C04B 35/64* (2013.01); *H01B 3/12* (2013.01); *C04B 2235/3206* (2013.01); *C04B 2235/3217* (2013.01); *C04B 2235/3222* (2013.01); *C04B 2235/6562* (2013.01); *C04B 2235/6567* (2013.01); *C04B 2235/763* (2013.01); *C04B 2235/786* (2013.01); *C04B 2235/87* (2013.01)

(58) Field of Classification Search
CPC ..... C04B 35/443; C04B 35/44; C04B 35/053; C04B 35/111; C04B 35/117
See application file for complete search history.

(56) References Cited

U.S. PATENT DOCUMENTS

| | | | |
|---|---|---|---|
| 6,723,442 B1 * | 4/2004 | Decker | H01M 8/02 428/469 |
| 9,845,266 B2 * | 12/2017 | Raffy | C04B 35/6455 |
| 2017/0096373 A1 * | 4/2017 | Raffy | C04B 35/6455 |
| 2019/0039956 A1 * | 2/2019 | Raffy | C04B 35/443 |
| 2019/0300377 A1 * | 10/2019 | Chikazawa | C01F 5/08 |

* cited by examiner

*Primary Examiner* — Karl E Group
(74) *Attorney, Agent, or Firm* — Alleman Hall Creasman & Tuttle LLP

(57) ABSTRACT

The present application relates to a magnesium oxide based dielectric ceramics with ultrahigh dielectric breakdown strength and a preparation method thereof. The composition of the magnesium oxide based dielectric ceramic material comprises: $(1-x)MgO$—$xAl_2O_3$, wherein $0<x\leq0.12$ and x is a mole percentage. The material has a specific composite structure with magnesium aluminate spinel acting as a second phase surrounding a principal crystalline phase, MgO.

2 Claims, 6 Drawing Sheets

MAGNESIUM OXIDE BASED DIELECTRIC CERAMICS WITH ULTRAHIGH DIELECTRIC BREAKDOWN STRENGTH AND ITS PREPARATION METHOD

TECHNICAL FIELD

The present application relates to a magnesium oxide based dielectric ceramic material with ultrahigh dielectric breakdown strength and a preparation method thereof, and belongs to the technical field of insulating materials.

BACKGROUND

Insulators refer to devices installed between conductors with different electrical potential or between a conductor and a ground electrode, supplying electrical insulation and mechanical support simultaneously. According to their materials, insulators can be divided into two categories: organics and inorganics. Polymers are usually distinguished for their excellent electrical insulation, easy shaping and other characteristics, while their high out-gassing rate, poor thermal stability and easy aging feature are detrimental to the long-term service of devices, let alone their huge differences in mechanical and thermal properties compared with metals in composite systems.

Compared with polymers, ceramics are superior in their excellent thermal stability, anti-aging, anti-corrosion, as well as their resistance to corona and arc ablation. Currently, relevant research is mainly focused on alumina porcelains and feldspar porcelains, which are widely used in industrial manufacturing. However, their relatively low dielectric breakdown strength and surface flashover strength restrict the development of relevant equipment and technology. Take alumina, for example: its dielectric breakdown strength and surface flashover strength are limited to 40 kV/mm and 50 kV/cm, respectively. With the development of ultra-high voltage transmission technology and pulse power technology, more demanding requirements are put forward for insulating materials. Therefore, exploring and researching new material systems to achieve ultra-high insulation properties is of great significance.

Magnesium oxide is a kind of high-insulating material with a wide band gap and ultra-high theoretical dielectric breakdown strength, whose bandgap width is nearly 7.8 eV and resistivity is high, up to $10^{11}$-$10^{13}$ Ω·cm at room temperature. Further, magnesium oxide is also outstanding in its remarkable thermal conductivity and coefficient of thermal expansion comparable to that of metals (the coefficient of thermal expansion of steel is $11 \times 10^{-6}$/°C., while that of magnesium oxide is $13.5 \times 10^{-6}$/°C.), which make it a good high-insulating material with immense potential. Nevertheless, the sintering temperature of magnesium oxide is too high to obtain a dense microstructure, and the coarse grains and macropores make it difficult to improve its dielectric breakdown strength. Even though a lot of effort has been made, such as addition of various sintering aids, dielectric properties of magnesium oxide ceramics tend to deteriorate to varying degrees.

SUMMARY

In view of the above problems, an object of the present invention is to provide a magnesium oxide based dielectric ceramics system with ultra-high dielectric breakdown strength and a preparation method thereof.

In one aspect, the present application provides a magnesium oxide based dielectric ceramic material with ultra-high dielectric breakdown strength, having a composition of $(1-x)MgO$—$xAl_2O_3$, wherein $0 < x \leq 0.12$ and x is a mole percentage, and having a composite structure with magnesium aluminate spinel acting as a second phase surrounding a principal crystalline phase.

In the present application, a "0-3" composite structure is obtained by the formation of second phase, magnesium aluminate spinel, around a principal crystalline phase, when introducing alumina into the magnesium oxide matrix. The "0-3" composite structure is a specific microstructure composed of nanoparticles and bulk material, where nanoparticles act as reinforcing phase in the matrix.

In an embodiment, magnesium source is calcined in advance to improve the sintering activity of magnesium oxide, and then alumina is introduced into a magnesium oxide matrix before sintering, leading to a specific composite structure with magnesium aluminate spinel acting as the second phase surrounding the principal crystalline phase, MgO. The abnormal grain growth of magnesium oxide is effectively inhibited with the help of the evenly distributed second phase around MgO, as well as a significant increase in density and a decrease in grain size (average grain size: 1 to 5 μm). Further, the mechanical properties of magnesium oxide based ceramics are greatly enhanced with their fracture behavior evolving from intergranular fracture to transgranular fracture. The dielectric breakdown strength and surface flashover strength of magnesium oxide based ceramics also show significant improvement: from 92.2 to 126.4 kV/mm and from 52.8 to 78.7 kV/cm, respectively. Preferably, an ultrahigh dielectric breakdown strength of 104.6 to 126.4 kV/mm and a surface flashover strength of 69.7 to 78.7 kV/cm can be achieved with appropriate composition design.

Preferably, $0.04 \leq x \leq 0.1$.

Preferably, a magnesium source may be calcined at 800 to 1,000° C. for 2 to 6 hours in advance to obtain the light-burnt magnesia. The light-burnt magnesia obtained by calcining magnesium source greatly enhances the sintering activity of magnesium oxide and solves the problem of abnormal grain growth and low density of magnesium oxide ceramics during sintering.

In another aspect, the present application provides a method for preparing the ultra-high dielectric breakdown strength magnesium oxide based dielectric ceramic material as described above, comprising the steps of:

weighing and mixing magnesia and alumina according to the composition to obtain mixed powders;

preparing a green body from the mixed powders; and sintering the green body to obtain the magnesium oxide based dielectric ceramic material with ultrahigh dielectric breakdown strength.

Preferably, the magnesia may be light-burnt magnesia obtained by calcining the magnesium source.

The problems of abnormal grain growth and low density in magnesium oxide ceramics are solved by means of power optimization and composition design, since light-burnt magnesia obtained by calcining magnesium source is utilized to improve sintering activity, and a second phase, magnesium aluminate spinel, is introduced intentionally by in-situ reaction between magnesia and alumina to construct the "0-3" composite structure. Magnesium oxide based ceramics prepared by this method is characterized in their high-insulating properties. The dielectric breakdown strength and surface flashover strength of magnesium oxide based ceramics prepared by the above-mentioned method are high up to 126.4 kV/mm and 78.7 kV/cm, respectively. Compared with alumina porcelains currently reported, the dielectric breakdown strength and surface flashover strength of the magnesium oxide based ceramics increase by two times and one time respectively, and endow the magnesium oxide based ceramics with great potential in the field of ultra-high voltage insulation and electrical vacuum insulation. In addition, magnesium oxide based ceramics prepared by the above-mentioned method are also advantageous in terms of low cost raw materials, simple composition and processes, and low production cost.

Preferably, the magnesium source may be at least one of basic magnesium carbonate, magnesium acetate, magnesium oxalate, magnesium hydroxide, and magnesium chloride.

Preferably, the calcining of magnesium source may be performed at 800 to 1000° C. for a period of 2 to 6 hours.

Preferably, preparing a green body from the mixed powders may comprise the steps of:

adding a binder to the mixed powders, and subjecting the mixture to spray granulation and press molding to obtain a molded body; and calcining the molded body to remove the binder.

Preferably, the binder may be at least one of polyvinyl alcohol, polyvinyl butyral, and phenolic resin, and preferably the binder is added in an amount of 2 to 7% by weight with respect to the total mass of the mixed powders.

Preferably, the molded green body may be subjected to isostatic pressing. Preferably, the pressure of the isostatic pressing may be 150 to 200 MPa and the time may be 10 to 20 minutes.

Preferably, the binder removal procedure may be performed at 600 to 800° C. for a period of 2 to 6 hours.

Preferably, the heating rate of calcining and sintering may be not higher than 4° C./min.

Preferably, the sintering temperature may be 1,500 to 1,550° C.

Preferably, the dwelling time of sintering may be 1 to 3 hours.

In a third aspect, the present application also provides a high-insulating component, for instance, an insulator, including the ultrahigh dielectric breakdown strength magnesium oxide based dielectric ceramic material as described above.

As compared with the prior art, the present application prepares an ultra-high dielectric breakdown strength magnesium oxide based dielectric ceramic material with the characteristics of fine grain, high density, and high mechanical strength by means of powder optimization and composition design to construct the "0-3" composite structure. The dielectric breakdown strength (sample size for testing: Φ7.8×0.5 mm) and surface flashover strength (sample size for testing: Φ26×7 mm) of magnesium oxide based ceramics prepared by the method as described above are high, up to 126.4 kV/mm and 78.7 kV/cm, respectively. Meanwhile, the material has a dielectric constant of 11 to 12, and a dielectric loss of less than 0.001 in the frequency range of 1 Hz to 1 MHz as well as a good frequency stability, which endow magnesium oxide based ceramics with great potential in the field of ultra-high voltage insulation, electrical vacuum insulation, and pulse technology. In addition, the material has the advantages of low cost raw materials, a simple composition and process, and low production cost.

DETAILED DESCRIPTION

Figure 1:
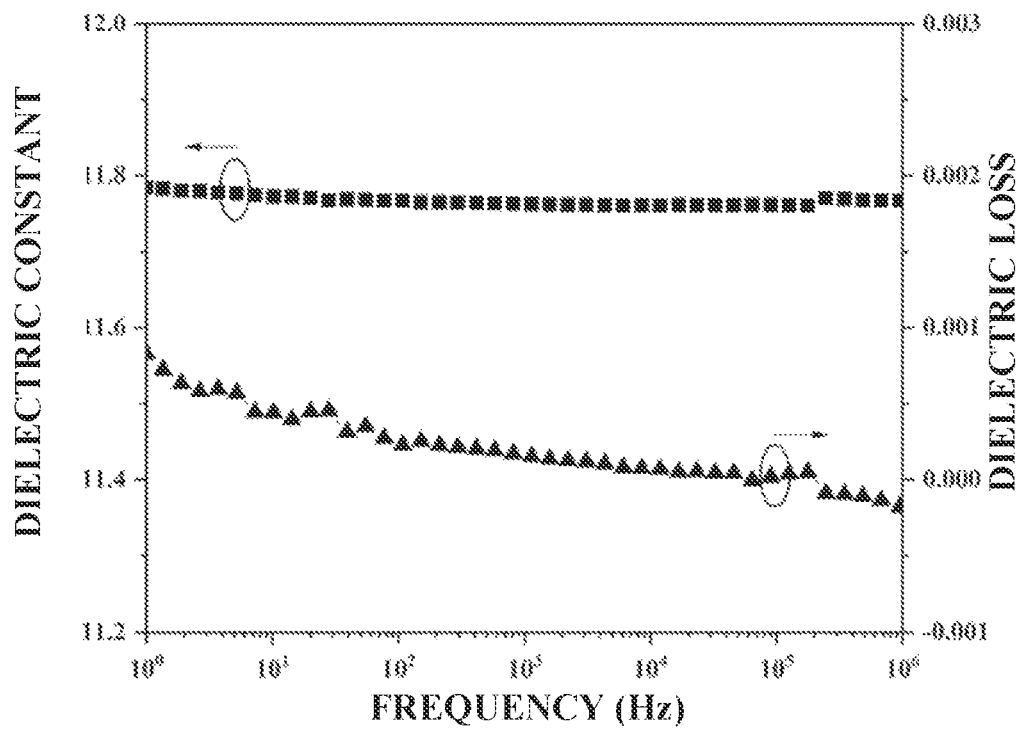
FIG. 1 shows the frequency dependence of the dielectric constant and loss of dielectric ceramics prepared in Example 1 of the present application.

Selected embodiments of the present disclosure will now be described. It will be apparent to those skilled in the art from this disclosure that the following descriptions of the embodiments of the disclosure are provided for illustration only and not for the purpose of limiting the disclosure as defined by the appended claims and their equivalents.

Herein, disclosed is a magnesium oxide based dielectric ceramic material with ultra-high dielectric breakdown strength, whose composition is $(1-x)MgO-xAl_2O_3$, wherein $0<x\leq0.12$ and x is a mole percentage of the corresponding component. The material has a "0-3" composite structure with magnesium aluminate spinel acting as a second phase surrounding a principal crystalline phase. When $x>0.12$, an excess amount of alumina addition will cause the enrichment of the second phase and thermal stress inside the bulks during voltage rising due to the mismatch between thermal expansion coefficients of MgO and $MgAl_2O_4$, leading to the deterioration of dielectric breakdown strength and surface flashover strength.

In an embodiment of this invention, the magnesium oxide based dielectric ceramic comprises the following composition: $(1-x)MgO-xAl_2O_3$, wherein $0<x\leq0.12$ and x is the mole percentage. Preferably, $0.04<x\leq0.1$. In this dielectric ceramic material, the "0-3" composite structure is obtained by the formation of a second phase, magnesium aluminate spinel, around a principal crystalline phase to inhibit the abnormal grain growth of the principal crystalline phase, MgO. The dielectric and mechanical properties of magnesium oxide ceramics are obviously enhanced with the mechanism of fine crystal strengthening and second phase strengthening, and endow the ceramics with characteristics of low dielectric loss, stable dielectric properties, and high insulation. Preferably, light-burnt magnesia obtained by calcining basic magnesium carbonate is chosen as raw material to enhance the sintering activity of magnesium oxide.

In an optional embodiment, a magnesium source is calcined to give light-burnt magnesia (MgO powder with high sintering activity). The light-burnt magnesia and an alumina powder are mixed in a stoichiometric ratio of $(1-x)MgO$—$xAl_2O_3$, and subjected to dry ball milling or wet ball milling followed by drying to give a powder. The powder is sieved through screens, and mixed with a binder. The resulting mixture is subjected to granulation, aging, press molding, binder removal, and sintering to obtain a magnesium oxide based dielectric ceramic material. A preparation method for the magnesium oxide based dielectric ceramic material provided by the present application is exemplarily described below.

The magnesium source is calcined to 800 to 1,000° C. with a heating rate of not higher than 3° C./min, and kept thereat for 2 to 6 hours to obtain light-burnt magnesia. The magnesium source can be at least one of basic magnesium carbonate, magnesium acetate, magnesium oxalate, magnesium hydroxide, and magnesium chloride. Preferably, basic magnesium carbonate is chosen as the magnesium source.

Light-burnt magnesia and alumina are weighed and mixed according to stoichiometric composition, and wet or dry ball-milled to obtain mixed powders. Wet ball-milling process is conducted in a nylon jar for 24 to 48 hours with mass ratio of raw material:agate ball:absolute ethyl alcohol equaling 1:(4-6):(1.8-2) or raw material:partially stabilized zirconia ball:absolute ethyl alcohol equaling 1:(6-8):(1.8-2). The slurry obtained from wet ball-milling is dried in oven at 60 to 70° C. Dry ball-milling process is conducted in an alumina jar for 12 to 24 hours with mass ratio of raw material:alumina ball equaling 1:(6-8). The ball-milled powders are sieved through screens (40 meshes for instance).

A binder is added to the mixed powders. Then the resulting mixture is subjected to spray granulation, aging, and press molding to obtain a green body. The binder may be at least one of polyvinyl alcohol, polyvinyl butyral, and phenolic resin. The concentration of the binder may be 5 to 7%. The amount of the binder as added may be 2 to 7% by weight with respect to the total mass of the mixed powder. The duration of aging may be 12 to 24 hours. The aging may be followed by sieving through screens (40 meshes for instance). The molded green body may be isostatically pressed sequentially. In an example, the mixed and granulated powders are dry pressed into a specific shape ($\Phi13\times2$ mm for instance). The pressure of press molding can be 1.3 to 2.0 MPa. A molded green body with a large size can be first press molded and then isostatically pressed at a pressure of 150 to 200 MPa and held at that pressure for 10 to 20 minutes. The shape of green body, isostatic pressure, and dwell time may be adjusted according to requirements.

The green body is heated to 600 to 800° C. with a heating rate of not higher than 2° C./min and kept thereat for 2 to 6 hours to remove binders and then cooled in furnace to room temperature. A binder removal procedure can eliminate organics and endow ceramic sheets with definite mechanical strength.

Following the binder removal procedure, the ceramic sheets are sintered. In an embodiment, the ceramic sheets are heated to 1,500 to 1,550° C. with a heating rate of 2° C./min or less and held thereat for 1 to 3 hours for sintering, and then cooled in furnace to room temperature to obtain magnesium oxide based dielectric ceramics.

In sintering, a layer of heavy-burnt magnesia could be laid between the ceramic sheets and an alumina bearing plate to protect the ceramic sheets from contamination caused by volatilization of impurities in alumina plate under high temperature.

The dielectric breakdown strength of the magnesium oxide based ceramics were tested at room temperature using a high voltage source: SD-DC 120 kV. The surface flashover strength was tested via a multi-functional insulation testing system invented by the Chinese Academy of Engineering Physics (test condition: vacuum degree of less than $5\times10^{-3}$ Pa, single pulse, pulse width of 5 µs, withstand voltage test). Dielectric properties of the magnesium oxide based ceramics were evaluated with a Novocontrol Alpha broadband dielectric spectrometer. Crystal structure and phase structure of the magnesium oxide based dielectric ceramics were analyzed by an X-ray diffraction with Cu Kα radiation. Via evaluation, the dielectric breakdown strength and surface flashover strength of the magnesium oxide ceramics prepared by this invention are high up to 126.4 kV/mm and 78.7 kV/cm, respectively. Meanwhile, the material has a dielectric constant of 11 to 12, and a dielectric loss of less than 0.001 in the frequency range of 1 Hz to 1 MHz as well as a good frequency stability, which endow magnesium oxide based ceramics with great potential in the field of ultra-high voltage insulation, electrical vacuum insulation, and pulse technology.

Hereinafter, the present invention will be further described with the following representative examples. It is understood that the following examples are only used to explain this invention and do not limit the scope of this invention, and any non-essential improvements and modifications made by a person skilled in the art based on this invention all fall into the protection scope of this invention. The specific parameters below are only exemplary, and a person skilled in the art can choose proper values within an appropriate range according to the description of this article, and are not restricted to the specific values cited below.

Example 1

Composition of the Material: $0.96MgO$—$0.04Al_2O_3$

Basic magnesium carbonate was heated to 900° C. with a heating rate of 2° C./min and kept thereat for 4 hours, and then cooled in furnace to room temperature to obtain light-burnt magnesia. The light-burnt magnesia and alumina were weighed according to the stoichiometric ratio of $0.96MgO$—$0.04Al_2O_3$ and mixed by wet ball-milling for 48 hours with a mass ratio of raw material:agate ball:absolute ethyl alcohol equaling 1:5:1.9. The slurry obtained from wet ball-milling was dried in an oven at 70° C. and then sieved through screens with 40 meshes. The powders were mixed with polyvinyl alcohol (PVA, 7%) at a ratio of 0.05 g PVA to 1 g mixed powders, and subjected to spray granulation. The granulated powder was press molded at a pressure of 1.5 MPa to give a first green body with a diameter of 13 mm and a thickness of 2 mm, and a second green body with a diameter of 35 mm and a thickness of 12 mm, and then isostatically pressed at a pressure of 200 MPa and dwelled for 20 minutes. The green bodies were heated to 600° C. with a heating rate of 2° C./min and kept thereat for 4 hours to remove the binder. The binder-removed green bodies were placed on an alumina bearing plate which was covered with a layer of heavy-burnt magnesia, heated to 200° C. with a heating rate of 1° C./min and kept thereat for 2 hours, heated to 800° C. with a heating rate of 1° C./min and kept thereat for 2 hours, heated to 1,200° C. with a heating rate of 2° C./min and kept thereat for 2 hours, and heated to 1,520° C. with a heating rate of 2° C./min and kept thereat for 2 hours, and then naturally cooled to room temperature to give two ceramic blocks. The obtained ceramic blocks were subjected to cutting and fine grinding to give a first cylindrical ceramic sheet having a diameter of 10 mm and a thickness of 0.5 mm, and a second cylindrical ceramic sheet having a diameter of 26 mm and a thickness of 7 mm. After ultrasonic cleaning and drying, the obtained ceramic sheets were screen-printed with silver paste and the electrode diameters of the first ceramic sheet and second ceramic sheet were 7.8 mm and 26 mm respectively. Afterwards, ceramics coated with electrodes were fired at 750° C. for 30 minutes for measurements of dielectric properties (sample size: Φ37.8×0.5 mm), dielectric breakdown strength (sample size: Φ7.8×0.5 mm), and surface flashover strength (sample size: Φ326×7 mm).

FIG. 1 shows the frequency dependence of the dielectric constant and loss of the ceramic sheet (sample size: Φ7.8× 0.5 mm) prepared in this example. It can be seen from FIG. 1 that the obtained ceramic material has a good frequency stability with a dielectric constant of about 11.78 and a dielectric loss of less than 0.001 in a frequency range of 1 Hz to 1 MHz. Table 1 shows the dielectric properties, dielectric breakdown strength, and surface flashover strength of the magnesium oxide based dielectric ceramics prepared in this example. It can be seen that its dielectric breakdown strength and surface flashover strength are 104.6 kV/mm and 69.71 kV/cm, respectively.

Example 2

Composition of the Material: $0.92MgO$—$0.08Al_2O_3$

Figure 2:
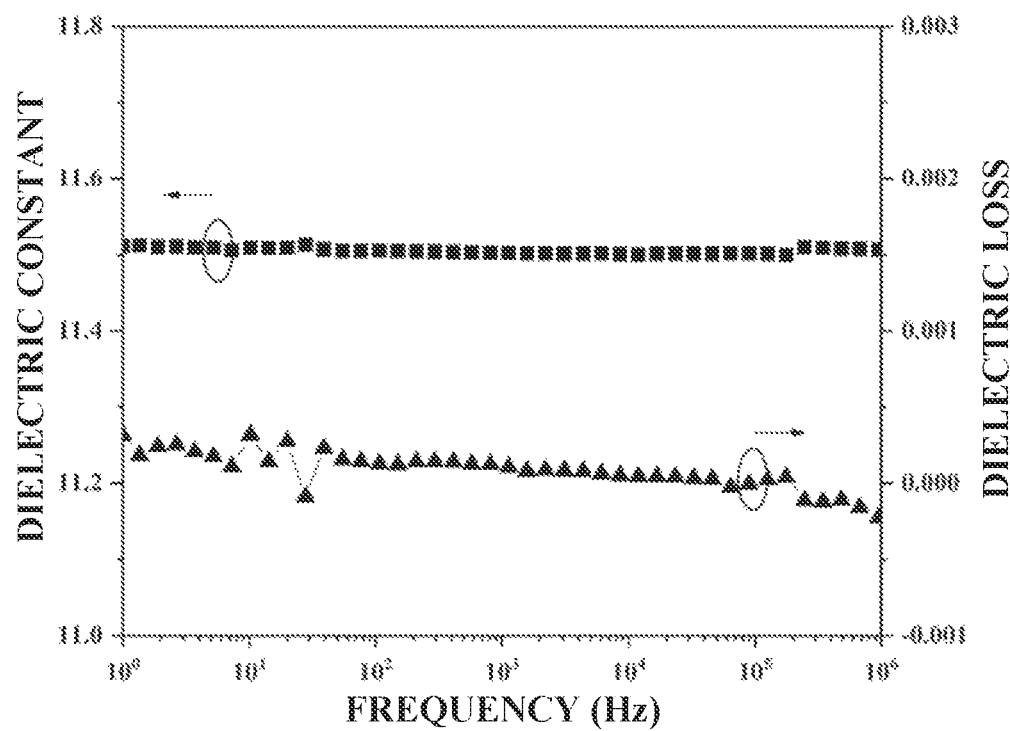
FIG. 2 shows the frequency dependence of the dielectric constant and loss of dielectric ceramics prepared in Example 2 of the present application.

Ceramics in Example 2 followed the same process as ceramics in Example 1 did except that its composition is $0.92MgO$—$0.08Al_2O_3$ and the green body was finally sintered at 1,540° C. for 2 hours to give a ceramic block. FIG. 2 shows the frequency dependence of the dielectric constant and loss of the ceramic sheets prepared in this example. It can be seen from FIG. 2 that the obtained ceramic material has a good frequency stability with a dielectric constant of about 11.52 and a dielectric loss of less than 0.001 in a frequency range of 1 Hz to 1 MHz. It can be seen from Table 1 that dielectric breakdown strength and surface flashover strength of the magnesium oxide based dielectric ceramics prepared in this example are 126.4 kV/mm and 74.3 kV/cm, respectively.

Example 3

Composition of the Material: $0.9MgO$—$0.1Al_2O_3$

Figure 3:
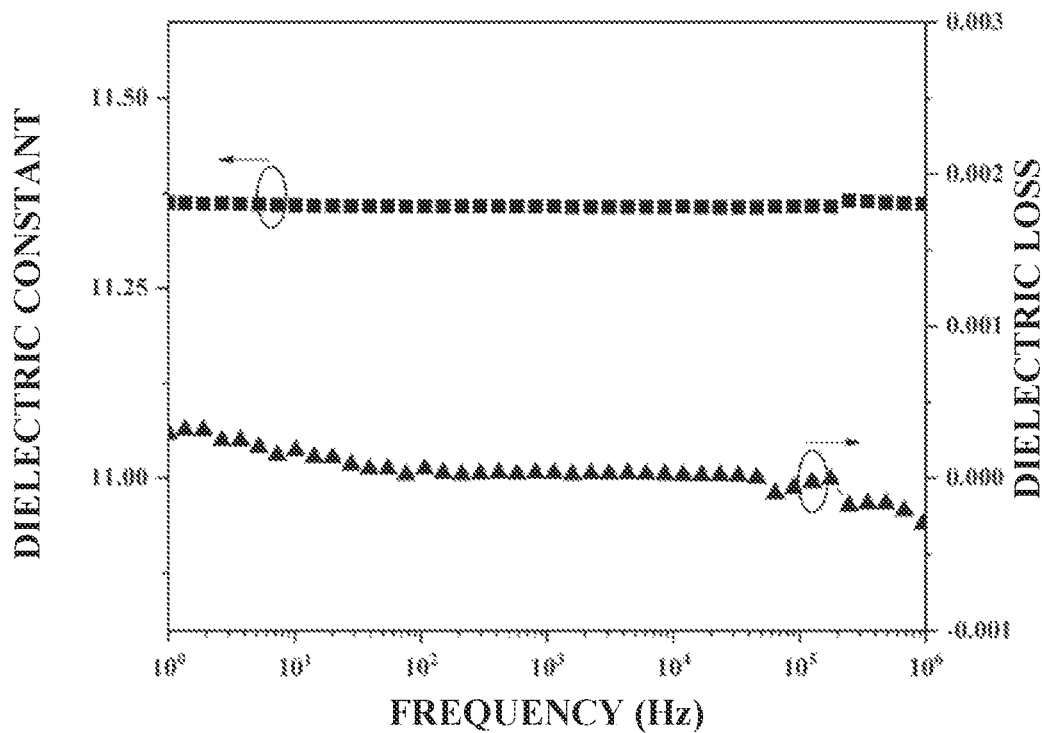
FIG. 3 shows the frequency dependence of the dielectric constant and loss of dielectric ceramics prepared in Example 3 of the present application.

Ceramics in Example 3 followed the same process as ceramics in Example 1 did except that its composition is $0.9MgO$—$0.1Al_2O_3$ and the green body was finally sintered at 1,550° C. for 2 hours to give a ceramic block. FIG. 3 shows the frequency dependence of the dielectric constant and loss of the ceramic sheets prepared in this example. It can be seen from FIG. 3 that the obtained ceramic material has a good frequency stability with a dielectric constant of about 11.37 and a dielectric loss of less than 0.001 in a frequency range of 1 Hz to 1 MHz. It can be seen from Table 1 that dielectric breakdown strength and surface flashover strength of the magnesium oxide based dielectric ceramics prepared in this example are 111.5 kV/mm and 78.7 kV/cm, respectively.

Comparative Example 1

Composition of the Material: MgO

Figure 4:
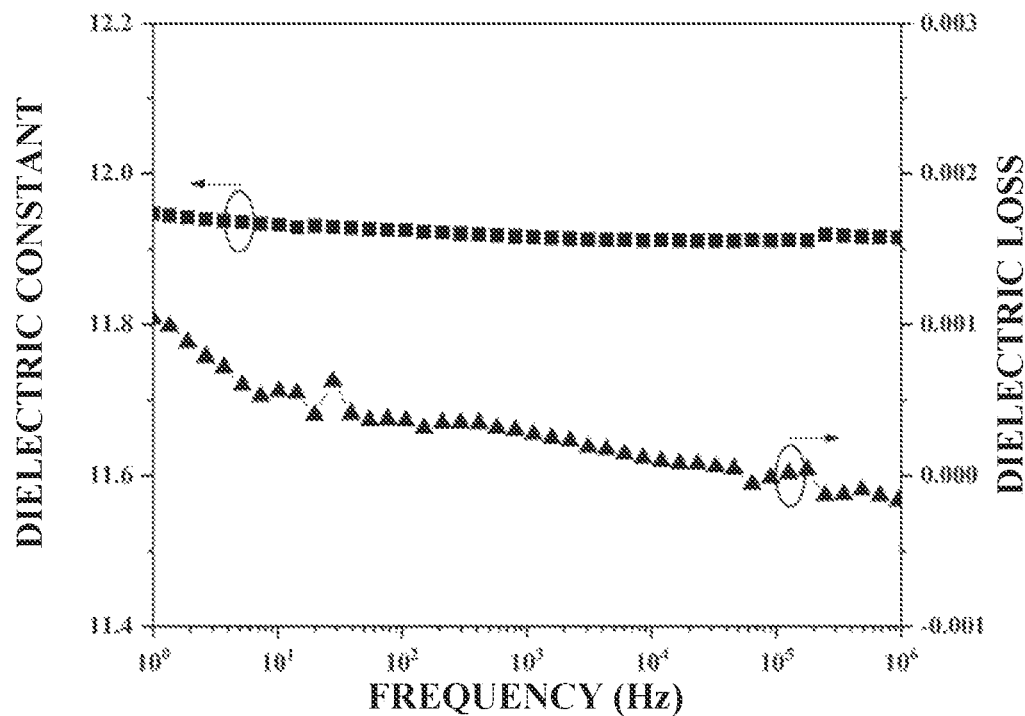
FIG. 4 shows the frequency dependence of the dielectric constant and loss of dielectric ceramics prepared in Comparative Example 1 of the present application.

Ceramics in Comparative Example 1 employed the light-burnt magnesia as raw material and followed the same process as ceramics in Example 1 did except that the green body was finally sintered at 1,500° C. for 2 hours to give a ceramic block. FIG. 4 shows the frequency dependence of the dielectric constant and loss of the ceramic sheets prepared in this example. It can be seen from FIG. 4 that the obtained ceramic material has a good frequency stability with a dielectric constant of about 11.96 and a dielectric loss of less than 0.001 in a frequency range of 1 Hz to 1 MHz. It can be seen from Table 1 that dielectric breakdown strength and surface flashover strength of magnesium oxide ceramics prepared in this example are 92.2 kV/mm and 52.8 kV/cm, respectively.

Comparative Example 2

Composition of the Material: $0.86MgO$—$0.14Al_2O_3$

Figure 5:
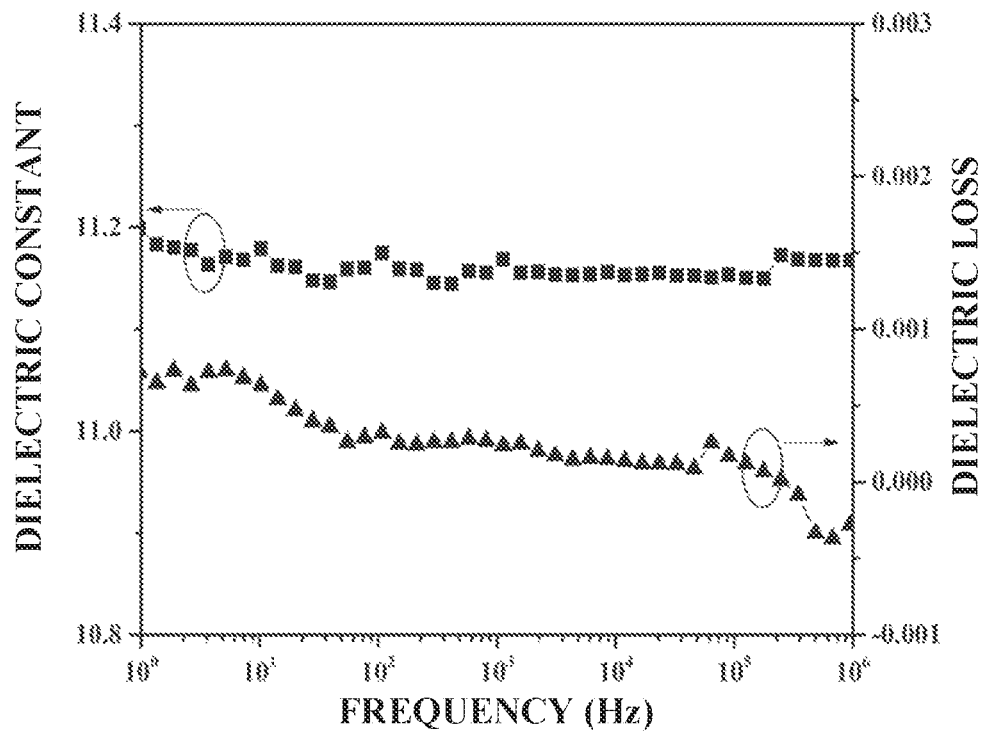
FIG. 5 shows the frequency dependence of the dielectric constant and loss of dielectric ceramics prepared in Comparative Example 2 of the present application.

Ceramics in Comparative Example 2 followed the same process as ceramics in Example 1 did except that its composition is $0.86MgO$—$0.14Al_2O_3$ and the green body was finally sintered at 1,550° C. for 2 hours to give a ceramic block. FIG. 5 shows the frequency dependence of the dielectric constant and loss of the ceramic sheets prepared in this example. It can be seen from FIG. 5 that the obtained ceramic material has a good frequency stability with a dielectric constant of about 11.18 and a dielectric loss of less than 0.001 in a frequency range of 1 Hz to 1 MHz. It can be seen from Table 1 that dielectric breakdown strength and surface flashover strength of the magnesium oxide based dielectric ceramics prepared in this example are 94.1 kV/mm and 59.4 kV/cm, respectively.

Figure 6:
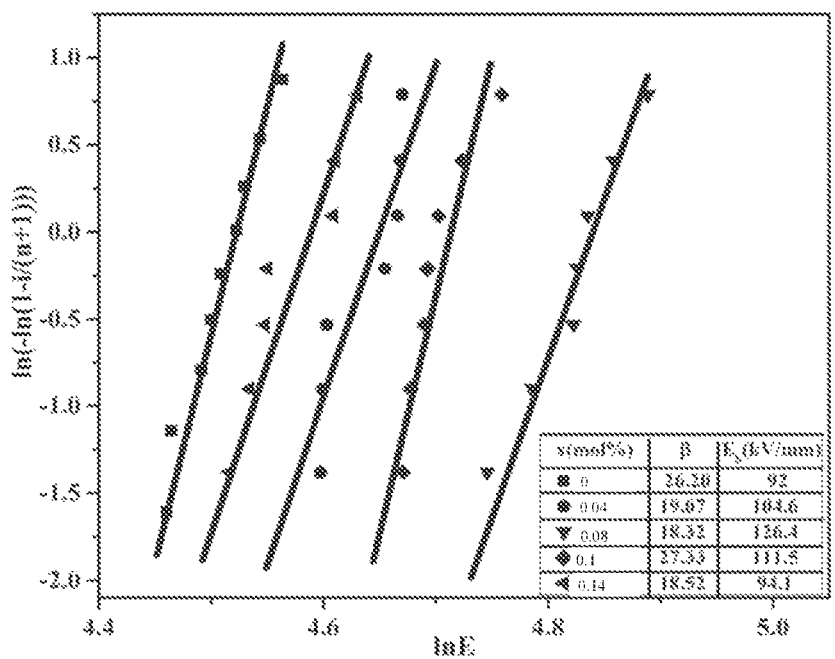
FIG. 6 shows the Weibull distribution of dielectric breakdown strength of dielectric ceramics prepared in Examples 1-3 and Comparative Examples 1-2 of the present application.

FIG. 6 shows the Weibull distribution of dielectric breakdown strength of the dielectric ceramics prepared in Examples 1-3 and Comparative Examples 1-2 of the present application and their dielectric breakdown strength are 104.6 kV/mm, 126.4 kV/mm, 111.5 kV/mm, 92.2 kV/mm, and 94.1 kV/mm, respectively.

Figure 7:
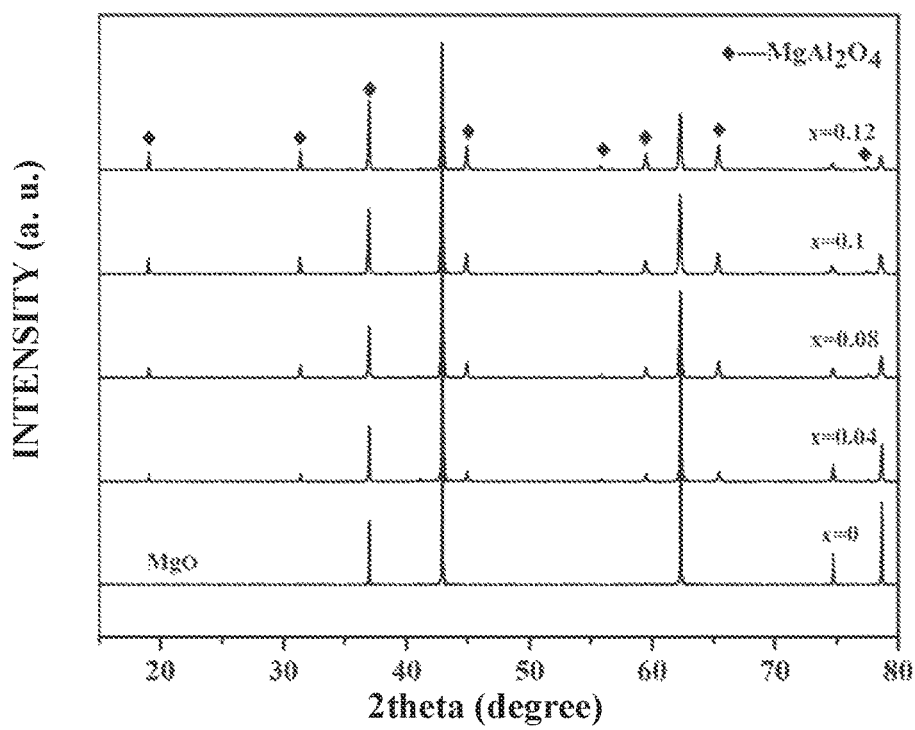
FIG. 7 shows the X-ray diffraction patterns of dielectric ceramics prepared in Example 1-3 and Comparative Example 1-2 of the present application.

FIG. 7 shows the X-ray diffraction patterns of the dielectric ceramics prepared in Examples 1-3 and Comparative Examples 1-2 of the present application. The composite structure of MgO (principal phase) and $MgAl_2O_4$ (magnesia alumina spinel, second phase) can be clearly observed without any other phases in $(1-x)MgO$—$xAl_2O_3$, while the diffraction peaks of $MgAl_2O_4$ become more obvious with the increase in $Al_2O_3$, which means the increase in $MgAl_2O_4$ content.

Figure 8:
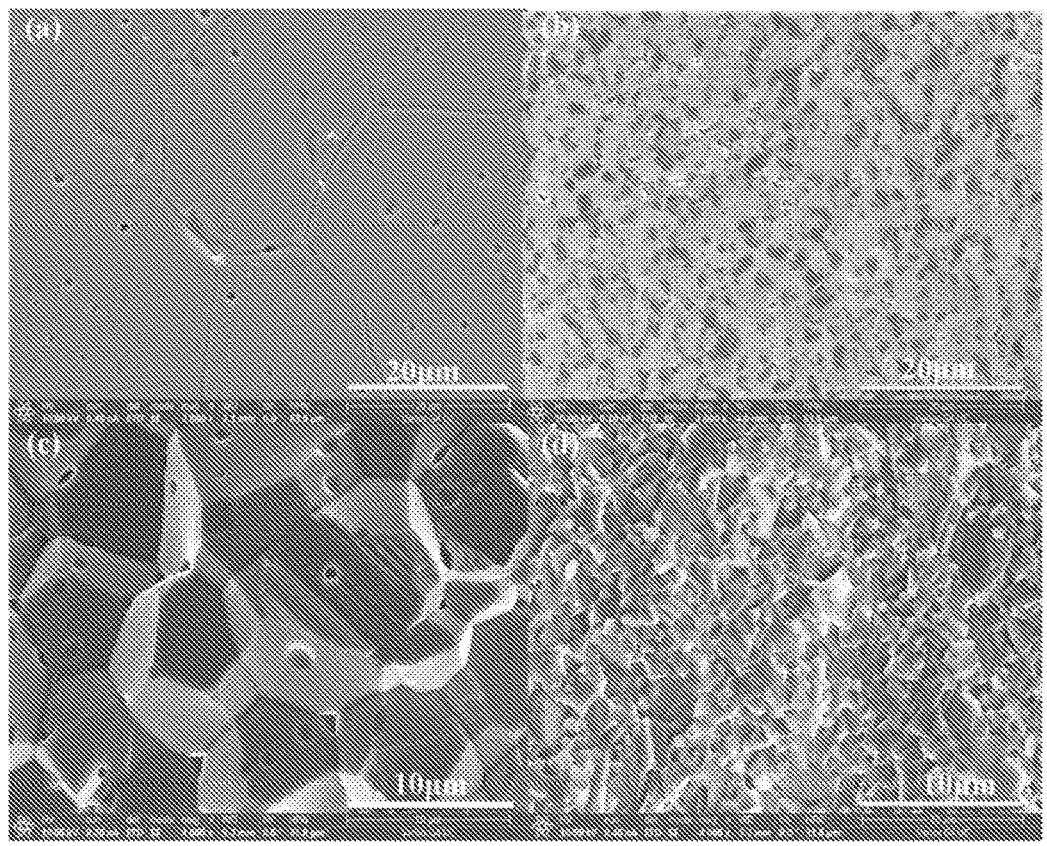
FIG. 8: (a) and (b) show the surface morphologies of dielectric ceramics prepared in Comparative Example 1 and Example 3 of the present application respectively, while (c) and (d) show the cross section morphologies of dielectric ceramics prepared in Comparative Example 1 and Example 3 of the present application, respectively.
Figure 9:
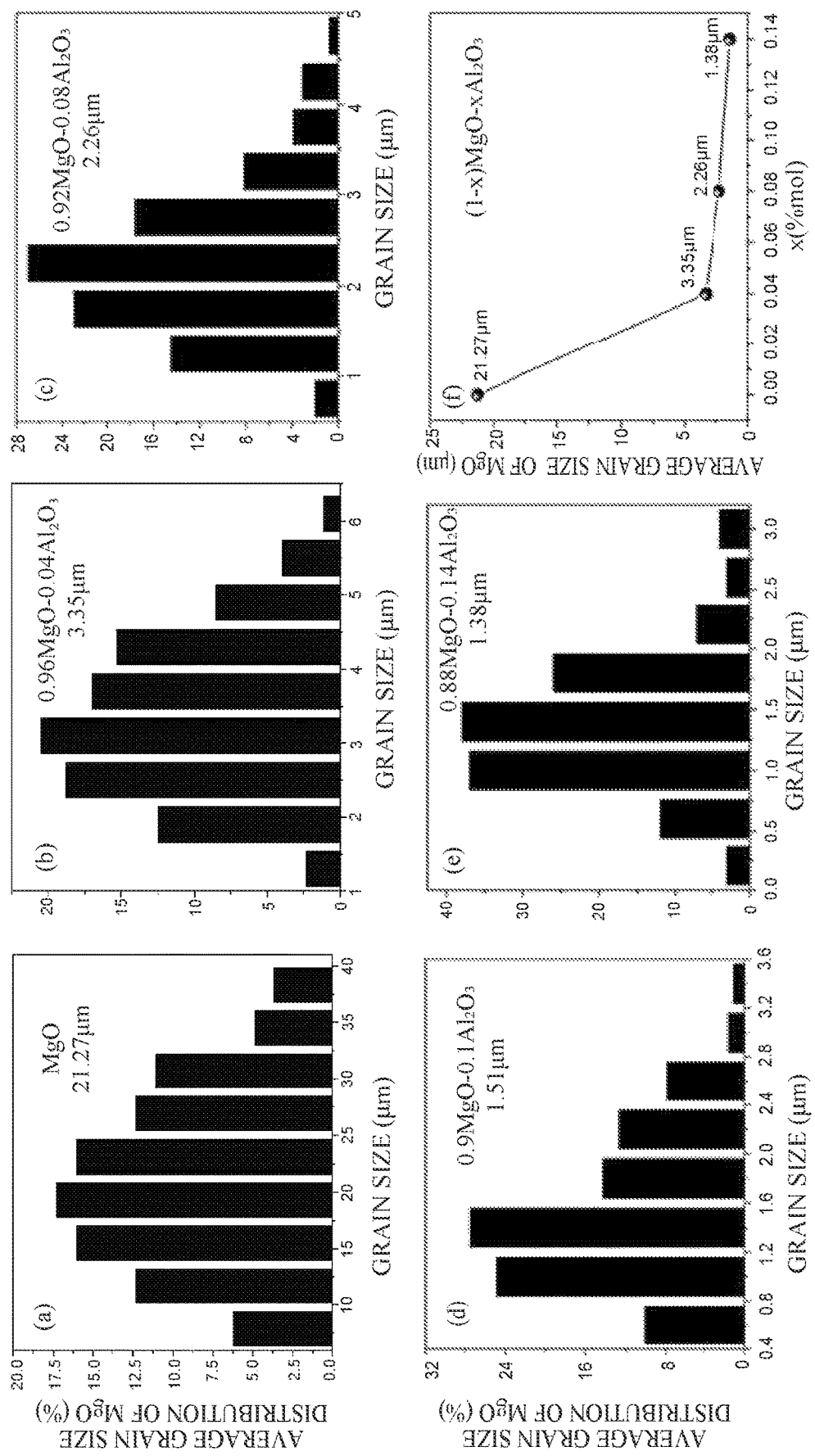
FIG. 9: graphs (a), (b), (c), (d), and (e) show a grain size distribution of dielectric ceramics prepared in Comparative Example 1, Example 1, Example 2, Example 3, and Comparative Example 2 of the present application, respectively. A graph (f) shows the variation of average grain size of dielectric ceramics prepared in Examples 1-3 and Comparative Examples 1-2 of the present application.
Figure 10:
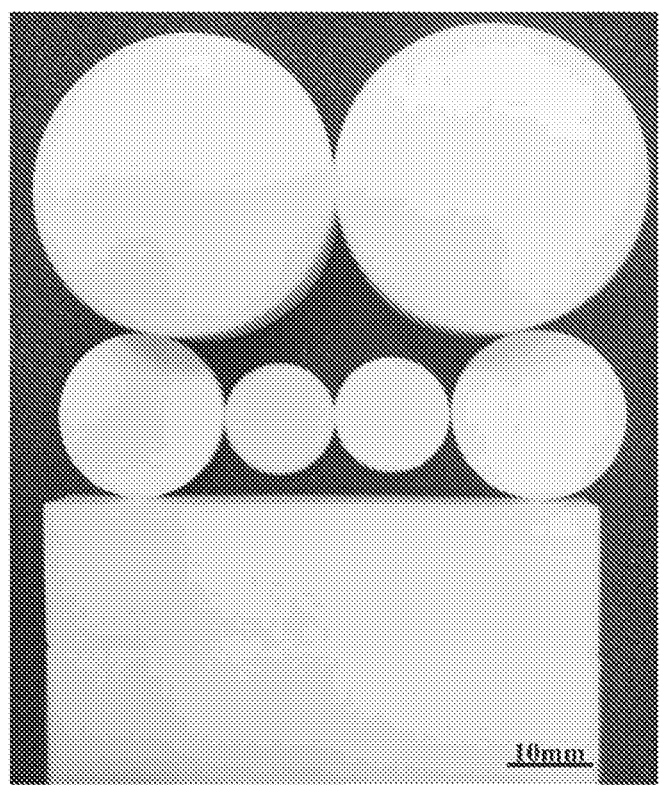
FIG. 10 is a photograph of dielectric ceramics prepared in Example 2 and Example 3 of the present application.

In FIG. 8, (a) and (b) show the surface morphologies of the dielectric ceramics prepared in Comparative Example 1 (MgO) and Example 3 ($0.92MgO$—$0.08Al_2O_3$), respectively, while (c) and (d) show the cross section morphologies respectively. FIG. 9 shows the grain size distribution of the dielectric ceramics. From the figures, the pure MgO ceramics shows relatively loosely arranged grains with a lot of pores and its average grain size is high up to 21.27 mm, which is caused by the fact that the MgO grains are able to grow at high sintering temperature. With the addition of $Al_2O_3$, the nano-sized second phase is formed and evenly distributed at the grain boundaries of MgO, leading to a brand new "0-3" composite structure. In this structure, the grain growth of MgO is successfully restricted with an average grain size decreasing to 1.37 μm, the MgO grain size distribution is more uniform, and the density is significantly improved. Further, from the cross section morphologies in FIG. 8, the mechanical properties of the magnesium oxide based ceramics are greatly enhanced since its fracture behavior evolves from intergranular fracture to transgranular fracture.

TABLE 1

Dielectric Properties, Dielectric Breakdown Strength and Surface Flashover Strength of Magnesium Oxide Based Dielectric Ceramics Prepared in Examples 1-3 and Comparative Examples 1-2

| | Dielectric Constant (room temperature, @1 kHz) | Dielectric Loss (room temperature, @1 kHz) | Dielectric Breakdown Strength (kV/mm) | Surface Flashover Strength (kV/cm) |
|---|---|---|---|---|
| Example 1 | 11.78 | <0.1% | 104.6 | 69.7 |
| Example 2 | 11.52 | <0.1% | 126.4 | 74.3 |
| Example 3 | 11.37 | <0.1% | 111.5 | 78.7 |
| Comparative Example 1 | 11.96 | <0.1% | 92.2 | 52.8 |
| Comparative Example 2 | 11.18 | <0.1% | 94.1 | 59.4 |

From the above examples, magnesium oxide based ceramics prepared in the present application are superior in dielectric breakdown strength and surface flashover strength than alumina porcelains and MgO ceramics. Further, the dielectric breakdown strength and surface flashover strength of MgO ceramics are 92.2 kV/mm and 52.8 kV/cm while those of the magnesium oxide based ceramics could be high up to 126.4 kV/mm and 78.7 kV/cm, showing that the construction of a composite structure greatly enhances not only its mechanical properties but also its insulation properties. All these characteristics endow the magnesium oxide based ceramics with great potential in the field of ultra-high voltage insulation, electrical vacuum insulation, and pulse technology. In addition, the material has the advantages of low cost raw materials, simple composition and process, and low production cost.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A magnesium oxide based dielectric ceramic material, having a composition of $(1-x)MgO\text{---}xAl_2O_3$, wherein $0.08 \leq x \leq 0.1$ and x is a mole percentage, and having a composite structure with magnesium aluminate spinel acting as a second phase surrounding a principal crystalline phase, MgO;

wherein the magnesium oxide based dielectric ceramic material has a dielectric breakdown strength of 111.5 to 126.4 kV/mm and a surface flashover strength of 74.3 to 78.7 kV/cm; and wherein the magnesium oxide based dielectric ceramic material is prepared by a method including:

weighing and mixing magnesia and alumina according to the composition of the magnesium oxide based dielectric ceramic material to obtain mixed powders, wherein the magnesia is light-burnt magnesia obtained by calcining magnesium source at a temperature of 800 to 1,000° C. for a period of 2 to 6 hours;

preparing a green body from the mixed powders; and sintering the green body at a temperature of 1,500 to 1,550° C. for a period of 1 to 3 hours to obtain the magnesium oxide based dielectric ceramic material having the composition of $(1-x)MgO\text{---}xAl_2O_3$.

2. The magnesium oxide based dielectric ceramic material according to claim 1, wherein the average grain size of the principal crystalline phase is 1 to 5 μm.

* * * * *